United States Patent [19]

Giese

[11] Patent Number: 4,667,974
[45] Date of Patent: May 26, 1987

[54] INCREASED ROLL STABILITY SUSPENSION SYSTEM

[75] Inventor: Ludi Giese, Redmond, Wash.

[73] Assignee: Paccar Inc., Bellevue, Wash.

[21] Appl. No.: 719,902

[22] Filed: Apr. 4, 1985

[51] Int. Cl.⁴ .............................................. B60G 5/00
[52] U.S. Cl. .................................. 280/81 A; 280/683
[58] Field of Search ............ 280/677, 682, 683, 81 A, 280/684, 685, 686, 687, 689, 725; 105/167, 168, 157 R, 199 A

[56] References Cited

U.S. PATENT DOCUMENTS 2,970,848  2/1961  Rice ...................................... 280/683
3,003,781  10/1961  Black .................................... 280/683

FOREIGN PATENT DOCUMENTS 1439744  7/1965  France ................................. 280/677
723978  2/1955  United Kingdom ............. 280/81 A Primary Examiner—John J. Love
Assistant Examiner—Karin L. Ferriter
Attorney, Agent, or Firm—Seed and Berry

[57] ABSTRACT

A vehicle suspension system having a low roll center to reduce lateral shifting and jolting, in combination with a stabilizer assembly to provide high roll stability is provided. In a preferred embodiment the roll center of the vehicle is positioned below the vehicle axles to reduce lateral shifting of the wheels with respect to the chassis. The stabilizer assembly is positioned above the axles and couples each axle of the tandem axle pair to the other to require counterbalancing movement of the axles for high roll resistance. The stabilizer assembly is mounted to the vehicle chassis at locations spaced apart from each axle to further reduce the degree of lateral shifting of the wheels with respect to the chassis.

1 Claim, 9 Drawing Figures

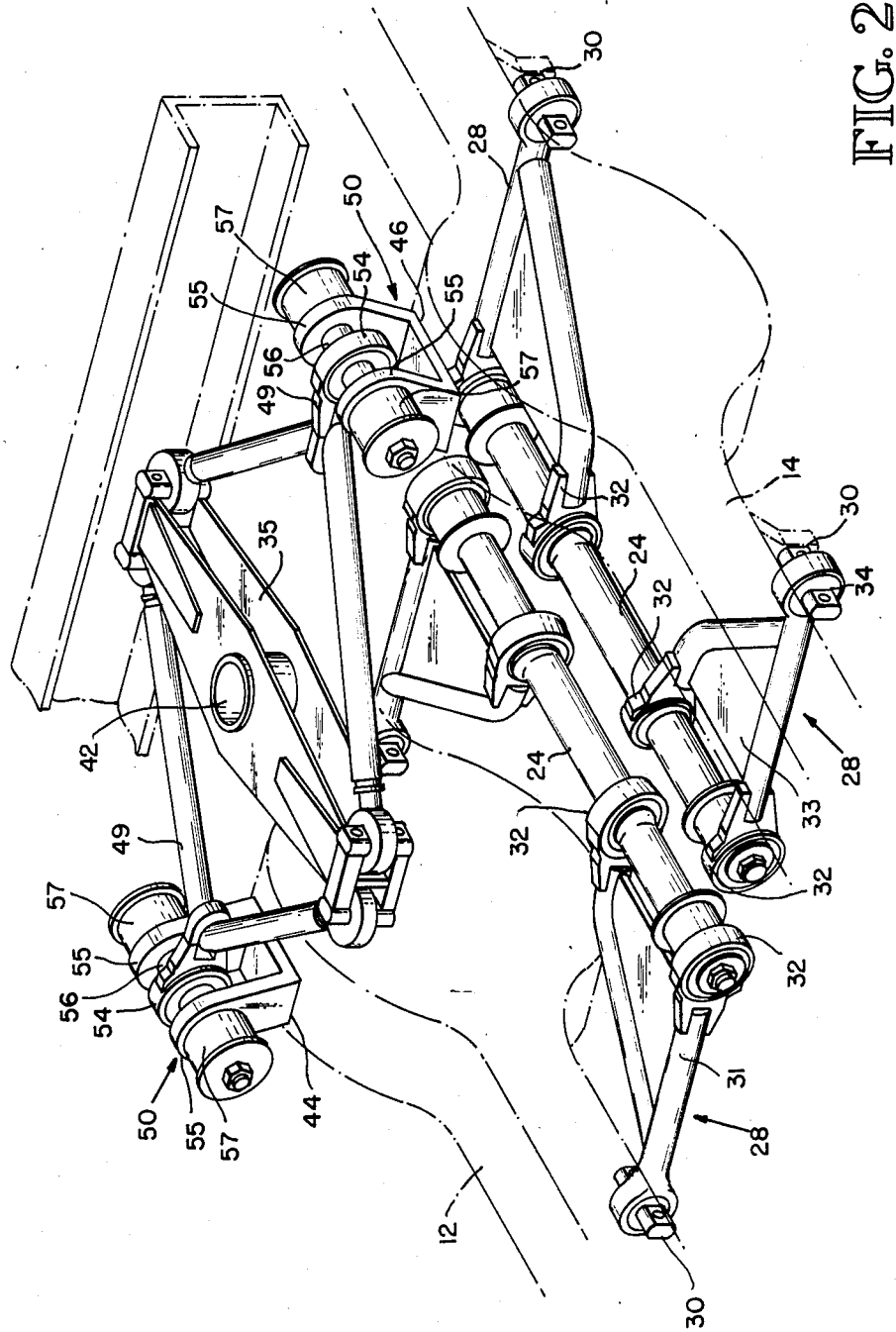

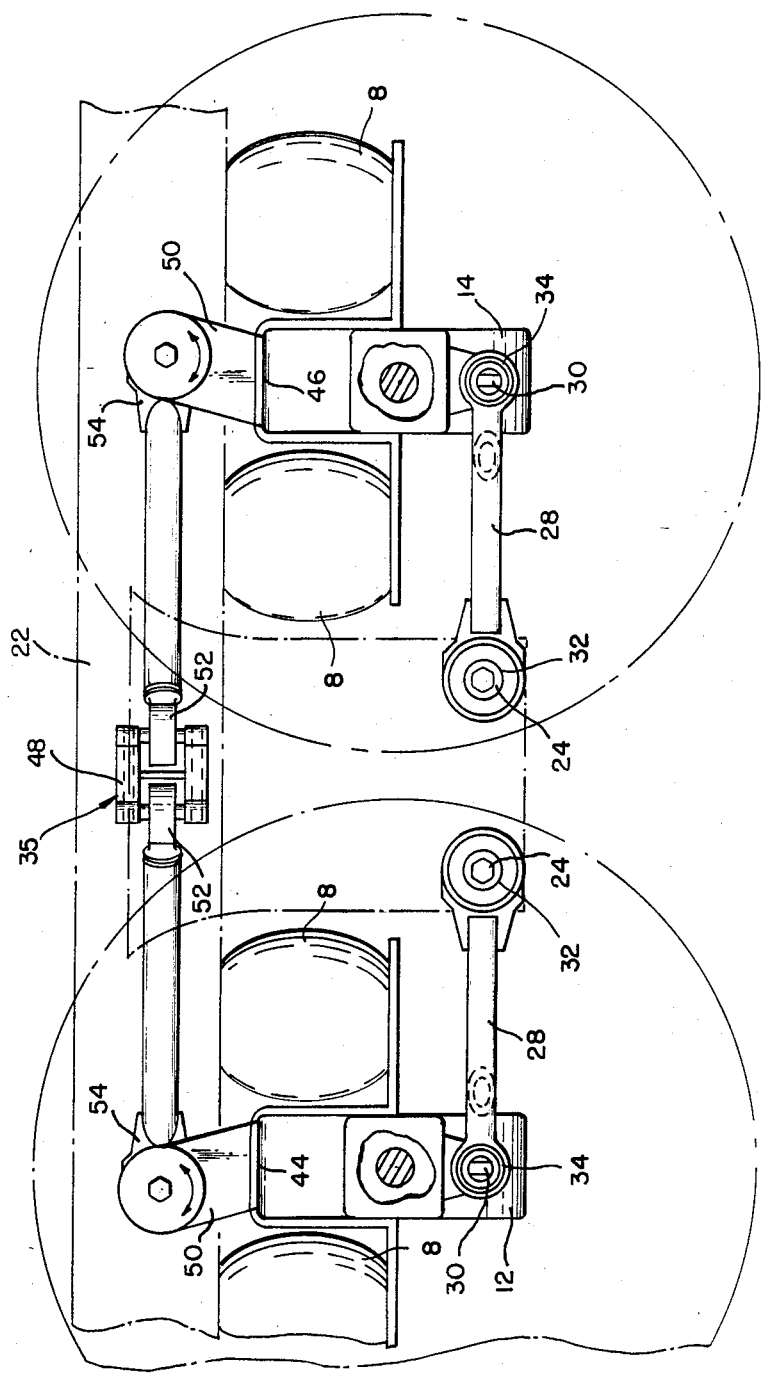

FIG. 5
PRIOR ART
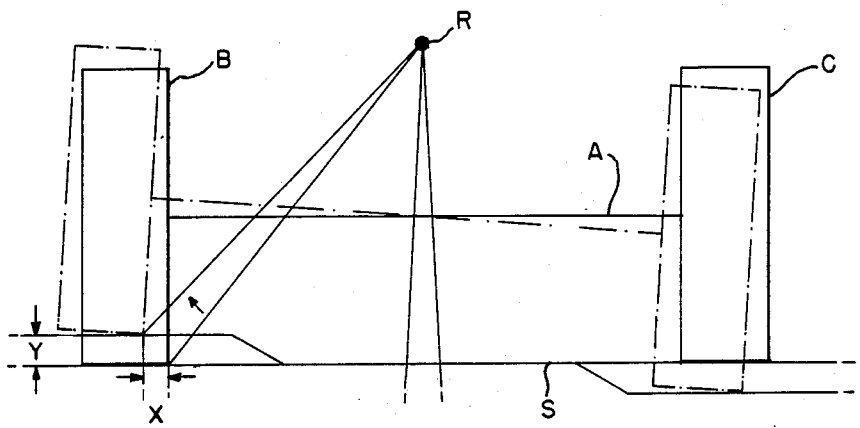
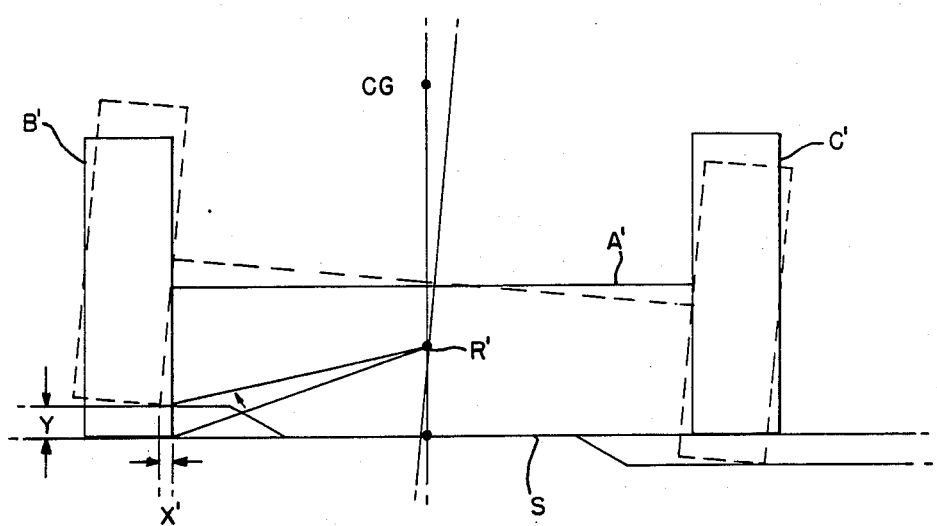
FIG. 6

INCREASED ROLL STABILITY SUSPENSION SYSTEM

DESCRIPTION

1. Technical Field

This invention relates to suspension systems for vehicles, more particularly to such a suspension system designed to provide increased roll stability and improved ride to vehicles such as tractor-trailer combinations.

2. Background Art

In suspension systems for tractor-trailer combinations, it is common to locate the roll center of the vehicle above the elevation of the vehicle axles. Such an arrangement will place the center of gravity of the trailer load relatively close to the roll center, thereby reducing the size of the roll moments.

Unfortunately, this arrangement has an undesirable effect when the vehicle axle encounters an upward or downward force on one side of the axle. Because the axle is constrained to move about the roll center, an upward or downward force on one side of the axle will cause the axle to rotate about the roll center. Such rotation will require a lateral shift between the axle and the vehicle chassis, which will tend to scuff the tires and transmit a jolt to the vehicle cab, causing an uncomfortable ride.

This phenomenon is illustrated schematically in FIG. 5. The solid lines of FIG. 5 illustrate a vehicle axle A having left and right wheels B, C attached to either side thereof and resting on a roadway surface S. The roll center R is positioned above the vehicle axle, as per a common prior art suspension systems. FIG. 5 illustrates in phantom lines the position of the axle and wheels when the left wheel is subjected to an uplifting force sufficient to raise the wheel a distance Y above the roadway surface. Because the wheels are constrained to move about the roll center, the upward movement of the wheel with respect to the road surface requires a corresponding lateral movement X of the wheel with the vehicle frame. It is this movement which causes the tire scuffing problems and lateral jolt problems experienced with existing vehicles.

3. Disclosure of the Invention

It is an object of the present invention to provide a tandem axle suspension system for heavy duty vehicles such as trucks.

It is another object of this invention to provide such a suspension system which will reduce the lateral shifting of the vehicle wheels with respect to the vehicle chassis.

It is another object of this invention to provide such a suspension system which will reduce jolts transmitted to the vehicle chassis from the wheels.

It is another object of this invention to provide such a suspension system which will provide a more comfortable vehicle ride.

It is another object of this invention to provide such a system which provides high roll stability.

These and other objects of the invention, which will become more apparent as the invention is described more fully above, are obtained by providing a vehicle suspension system having a low roll center to reduce lateral shifting and jolting, in combination with a stabilizer assembly to provide high roll stability.

In the preferred embodiments of the invention illustrated herein, the roll center of the vehicle is positioned below the vehicle axles to reduce lateral shifting of the wheels with respect to the chassis. The stabilizer assembly above the axles couples each axle of the tandem axle pair to the other to require counterbalancing movement of the axles for high roll resistance. The stabilizer assembly is mounted to the vehicle chassis at locations spaced apart from each axle to further reduce the degree of lateral shifting of the wheels with respect to the chassis.

BRIEF DESCRIPTION OF THE DRAWINGS

FIG. 2 is an isometric view of the embodiment of FIG. 1, illustrated with some of the chassis components removed and the tandem axles illustrated in phantom line to better illustrate the elements of the present embodiment.

FIG. 3 is a side elevation view of the embodiment of FIG. 1.

FIG. 5 is a schematic view illustrating lateral shifting of vehicle wheels with respect to the vehicle chassis in a prior art system having a high roll center.

FIG. 6 is a schematic view illustrating the degree of lateral shifting in a system such as the present invention where the roll center is positioned below the axle level.

BEST MODE FOR CARRYING OUT THE INVENTION

FIGS. 1-4, 6, 7, 8A and 8B illustrate preferred embodiments of the present invention. In these embodiments, the movement of the axles is constrained below the axle to provide a low roll center. A stabilizing unit is provided in conjunction with the low roll center to provide stability. The suspension system of the present invention is used in conjunction with vertical springs, such as leaf springs, rubber cushions, or air bags 8 as illustrated in FIG. 3.

FIG. 6 illustrates schematically the effect of the low roll center. A pair of wheels B', C' are mounted on an axle A' and illustrated in a normal operating position in solid lines. The roll center R' of the vehicle is positioned below the axle. FIG. 6 illustrates in phantom lines the position of the wheels and axle when the left wheel B' is subjected to an uplifting force sufficient to raise it a distance Y above the roadway surface S. Because the wheels are constrained to move about the roll center, the upward movement of the wheel produces a corresponding lateral movement of the wheel a distance X' from its original position.

As discussed above in the Background section, it is this lateral shifting which causes undesirable tire scuffing and cab jolting. By comparing the lateral shifting distance X' provided by the low roll center configuration of FIG. 6 with the lateral shifting distance X produced by the high roll center configuration of FIG. 5, it can be seen that the lower roll center configuration greatly reduces the amount of lateral shift produced by a given positive or negative vertical displacement Y. This reduction will in turn reduce the amount of tire scuffing and the severity of the jolting action. By studying the geometric relationship between the elevation of the roll center and the lateral shifting distance, it will be appreciated that the closer the roll center is to the roadway surface, the less the lateral shifting distance will be for a given positive or negative vertical displacement.

Although a suspension system having a low roll center is advantageous in that it provides reduced lateral shifting, lowering the roll center of a suspension system produces some undesirable effects. In a typical tractor trailer, for example, the center of gravity CG of the vehicle load is well above the vehicle axle. By lowering the roll center to a location below the axle, the moment arm between the vehicle load and the roll center is increased substantially, thereby increasing the roll moments produced by the vehicle load during cornering, for example. In the preferred embodiments of the present invention, illustrated herein, a novel stabilizer assembly 18, is combined with a low roll center to provide a stable suspension system with the advantages of a low roll center.

Figure 1:
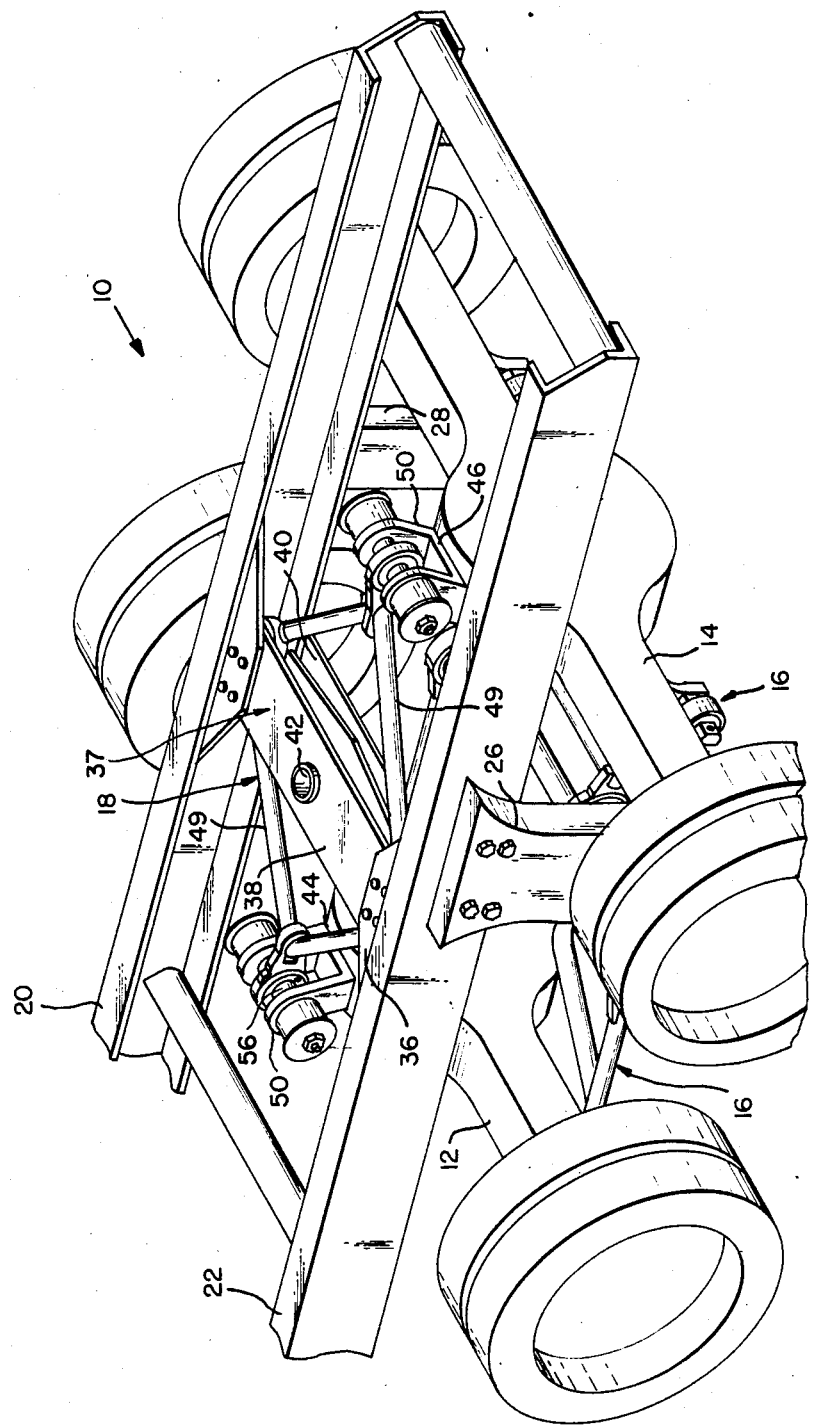
FIG. 1 is an isometric view of a preferred embodiment of the present invention.

An improved system 10 according to the present system is illustrated in FIGS. 1–3. The system constrains and couples a front axle 12 and a rear axle 14 of a tandem axle combination of a vehicle such as a heavy duty truck. The underside of each axle is constrained by a corresponding control arm assembly 16 to locate the roll center below each axle. A stabilizer unit 18 is mounted to the vehicle chassis between the cab rails 20, 22 and coupled to each axle to require counterbalancing movement of the axles.

CONTROL ARM ASSEMBLIES

In the preferred embodiments illustrated herein, the roll center of the vehicle is fixed below the axles by means of control arm assemblies which correspond to each axle. Each control arm assembly includes a transverse arm 24 which extends transversely beneath the vehicle chassis, as best seen in FIG. 2. The outer ends of the transverse arms are mounted to left and right frame brackets 26 which depend from each cab rail to an elevation below the axles, as best illustrated in FIG. 3. Each axle is connected to its corresponding transverse arm by a pair of control arms 28 which, when in a neutral position, extend generally horizontally between the transverse arm and an axle mounting 30 which depends from the underside of the axle, as illustrated in FIG. 2. In the preferred embodiments illustrated herein, the control arms have two spaced apart finger members 31 which form a Y-shaped configuration with a support plate 33 forming a reinforcing web therebetween. The control arms make two spaced apart pivotal connections 32 to the transverse arm and a single pivotal connection 34 at the axle mounting. Each such pivotal connection pivots only in a vertical plane to allow vertical displacement of the axle with respect to the vehicle frame, yet constrains lateral or transverse movement or rotation at the connection point. The effect of the control arm assemblies is thus to locate the roll center of the vehicle just below the axles, thereby lowering the roll center.

STABILIZER UNIT

A preferred embodiment of a stabilizer unit 18 as used in one preferred embodiment of the present invention is illustrated in FIGS. 1–3. The stabilizer unit is rotatably mounted between the cab rails and coupled to each axle to provide the added roll stability needed when using a low roll center. The stabilizer unit is connected to the vehicle chassis by means of a stabilizer yoke 35 which is pivotally mounted within a mounting assembly 37 which spans the two cab rails. The mounting assembly includes gussets 36 which extend inwardly from the cab rails and an upper mounting plate 38 and lower mounting plate 40 which extend transversely between the cab rails as illustrated in FIG. 1. The stabilizer yoke is pivotally mounted between the upper and lower mounting plates at a central connection point 42 for pivotal movement in a horizontal plane. The stabilizer yoke surrounds the central connection point and extends transversely outward therefrom toward each cab rail. The stabilizer yoke is coupled to the axles by means of a pair of v-shaped linkage members 49 which project outwardly from the stabilizer yoke toward each axle.

Each linkage member is connected to a corresponding axle by an axle connection member 50. The connection between the linkage member and the axle preferably provides at least two degrees of freedom. In the preferred embodiment illustrated herein, the connection member includes a horizontally positioned pin 56 on which the closed end 54 of the linkage member is mounted. The pin is mounted in two spaced apart vertical surfaces 55 of the connection member leaving a portion of the pin between the surfaces where the closed end of the linkage member can move freely in the transverse direction. The pin extends transversely outward from each of the vertical surfaces, as seen in FIG. 2. Rubber cushions 57 are mounted outside the vertical surfaces on the pins to provide the desired resistance to outward deflection of the vertical surfaces in response to transverse force from the linkage member.

Figure 7:
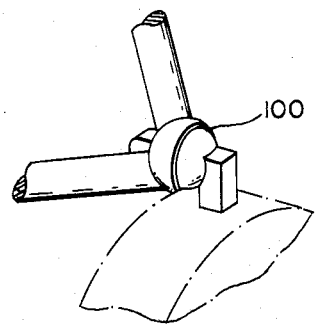
FIG. 7 is an isometric view of an alternative embodiment of an axle connection for a stabilizer unit of the present invention.

It is believed that alternate connection means between the linkage member and its corresponding axle may work equally well. For example, a ball and socket connection 100 can be provided between the closed end of the linkage member and the corresponding axle as illustrated in FIG. 7. When such an arrangement is used, it is preferred that a bushing providing a certain degree of compliance, such as bushings commercially available from the Hedrickson Company of Burr Rigde, Ill. be employed at the central connection point.

The open ends 52 of each V-shaped linkage member are pinned to opposite ends of the stabilizer yoke for pivotal movement in a horizontal plane, as best illustrated in FIG. 3.

Figure 4:
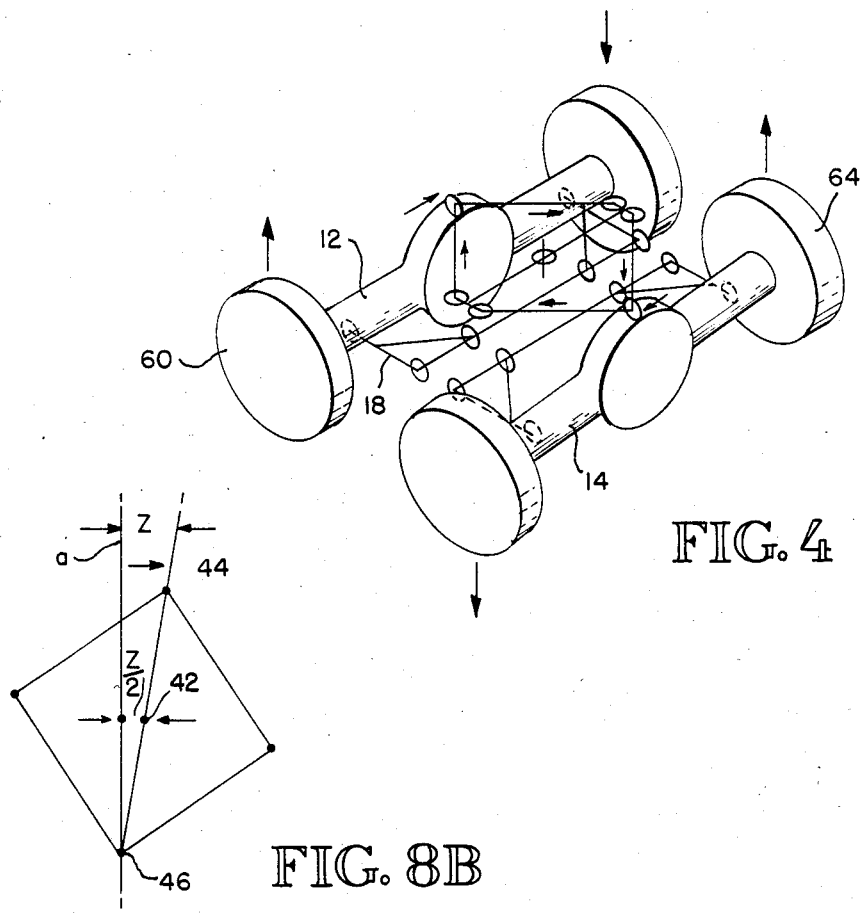
FIG. 4 is an isometric view illustrating schematically the counterbalancing movement of the tandem axles.

FIG. 4 illustrates schematically the effect of the stabilizer unit on the vehicle. The front left wheel of the tandem axle combination has been subjected to an uplifting force. With the low roll center provided by the control arm assemblies, this motion will cause the front axle to shift transversely to the right, as illustrated in FIG. 6. Because the forward end of the stabilizer unit is fixedly mounted to the front axle, the forward end will move to the right along with the axle, cause the V-shaped linkage members to shift correspondingly in the direction indicated by the arrows in FIG. 4, thereby causing the rear end of the stabilizer unit to shift to the left. This shifting will tend to cause the rear axle to rotate counterclockwise about the low roll center, producing a downward force in the left rear wheel to counterbalance the roll movement produced by the original uplifting force.

When both axles are subjected to common roll forces, such as when the vehicle travels around a banked curve, a common side of each axle will tend to be raised with respect to the chassis. Because of the low roll center, any vertical displacement of the axle with respect to the chassis will be accompanied by a transverse displacement as well. As described above, the stabilizer unit is designed to require opposed transverse movement of the axles to counterbalance the increased roll forces produced by the low roll center. When each axle is subjected to common roll forces, the stabilizer unit will restrain and oppose the natural movement of the axles which would otherwise result.

Figure 8A:
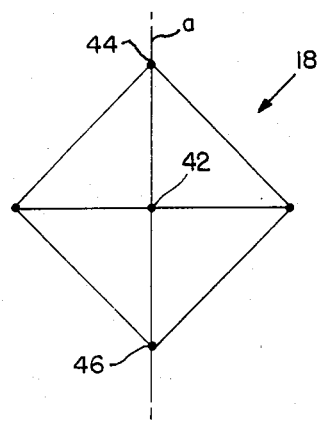
FIG. 8A is a schematic illustration in top plan view of the operation of the stabilization assembly of the present invention.
Figure 8B:
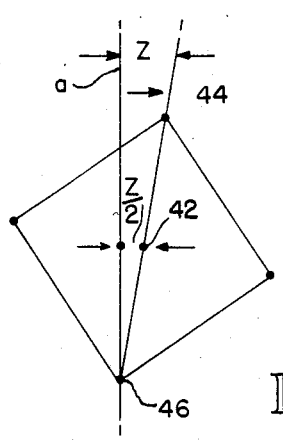
FIG. 8B is a schematic illustration according to FIG. 8A.

The stabilizer unit also serves to reduce the amount of lateral axle shifting which is transmitted to the vehicle chassis. Although the stabilizer unit is connected directly to the axles at the axle connection points and the fore and aft ends of the stabilizer unit will thus shift directly with the axles, only the lateral movement which occurs at the central pinned connection is transferred to the vehicle chassis. The effect of this phenomenon is illustrated schematically in the top plan views of FIGS. 8A and 8B. FIG. 8A illustrates the stabilizer unit 18 in a neutral position, with the front axle connection point 44, the central pinned connection 42 and the rear axle connection point all aligned longitudinally. When the left wheel of the front axle is raised, the front axle will shift to the right. FIG. 8B illustrates a rightward shift of a distance Z in response to such motion. If the rear axle remains on the roadway surface, no lateral shifting of the rear axle will occur and thus the stabilizer unit will pivot about the rear axle connection point 46 as illustrated, resulting in a lateral shift of Z/2 at the central pinned connection. Thus, the amount of lateral shift which is passed on to the vehicle chassis (and cab) is half of that experienced by the axles.

Although the invention has been described and disclosed herein with respect to particular embodiments, there are equivalent embodiments (not disclosed herein) which will embody the present invention. It is not intended that the present invention be limited to the embodiments disclosed and described herein, but rather that it include all embodiments which are within the spirit of the present invention.

I claim:

1. A suspension system for suspending an elongated chassis of a vehicle, such as a heavy duty truck, above the front axle and rear axle of a transversely extending tandem axle combination, the suspension system comprising:

means for locating the roll center of the vehicle at an elevation below the elevation of the axles; and a stabilizer unit for providing roll stability to the vehicle, the stabilizer unit being mounted to the vehicle chassis at a pivot point longitudinally intermediate the front axle and the rear axle of the tandem axle combination for rotation in a generally horizontal plane, the stabilizer unit including a pair of linkage members, each linkage member extending generally longitudinally outward from the pivot point in a direction opposite from the other linkage member and toward a corresponding axle, such that the inner ends of the linkage members simultaneously rotate about the pivot point with the stabilizer unit, the outer end of each linkage member being coupled to the corresponding axle for transverse movement therewith, such that transverse movement of one axle will rotate the stabilizer unit to produce a counterbalancing effect at the other axle.

* * * * *